US011115355B2

(12) United States Patent
Yan et al.

(10) Patent No.: US 11,115,355 B2
(45) Date of Patent: Sep. 7, 2021

(54) INFORMATION DISPLAY METHOD, APPARATUS, AND DEVICES

(71) Applicant: Alibaba Group Holding Limited, Grand Cayman (KY)

(72) Inventors: Zekun Yan, Hangzhou (CN); Yufeng Wang, Hangzhou (CN); Yuan Li, Hangzhou (CN); You Wu, Hangzhou (CN); Qiang Li, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 135 days.

(21) Appl. No.: 16/144,892

(22) Filed: Sep. 27, 2018

(65) Prior Publication Data

US 2019/0104095 A1 Apr. 4, 2019

(30) Foreign Application Priority Data

Sep. 30, 2017 (CN) .......................... 201710916541.2

(51) Int. Cl.
*H04L 12/58* (2006.01)
*G06F 40/58* (2020.01)
*H04M 1/72403* (2021.01)

(52) U.S. Cl.
CPC .............. *H04L 51/04* (2013.01); *G06F 40/58* (2020.01); *H04L 51/046* (2013.01); *H04L 51/18* (2013.01); *H04M 1/72403* (2021.01)

(58) Field of Classification Search
None
See application file for complete search history.

(56) References Cited

U.S. PATENT DOCUMENTS 6,470,306 B1* 10/2002 Pringle .................. G06F 40/58
704/3
8,027,438 B2 9/2011 Daigle et al.
(Continued)

FOREIGN PATENT DOCUMENTS

| WO | WO2008144251 A | 11/2008 |
|---|---|---|
| WO | WO2012085899 A1 | 6/2012 |
| WO | WO2016062073 A1 | 4/2016 |

OTHER PUBLICATIONS

The PCT Search Report and Written Opinion dated Dec. 13, 2018 for PCT Application No. PCT/US2018/053212, 7 pages.

*Primary Examiner* — Jonathan C Kim
(74) *Attorney, Agent, or Firm* — Lee & Hayes, P.C.

(57) ABSTRACT

An information display method, and apparatus, and devices are provided. The method includes providing an information editing interface; receiving a first type of information input by a user in the information editing interface; obtaining a second type of information corresponding to the first type of information, wherein the second type of information is translation information of the first type of information; and displaying the second type of information in the information editing interface. By adopting the technical solutions of the present disclosure, when the user inputs information in the information editing interface, the information input by the user may be synchronously translated, the translated information is displayed to the user by the information editing interface, so during the process when the user inputs the information, the translation information of the then-input information may be seen in real time, and the translation information may be modified, thereby improving user experience.

20 Claims, 9 Drawing Sheets

(56) References Cited

U.S. PATENT DOCUMENTS

| | | | |
|---|---|---|---|
| 8,630,840 B1 | 1/2014 | Smith | |
| 8,660,244 B2 | 2/2014 | Blagsvedt et al. | |
| 8,983,850 B2 | 3/2015 | Hale et al. | |
| 9,372,853 B1* | 6/2016 | Poupko | G06F 40/58 |
| 2001/0029455 A1 | 10/2001 | Chin et al. | |
| 2003/0125927 A1 | 7/2003 | Seme | |
| 2007/0208813 A1* | 9/2007 | Blagsvedt | H04L 51/063 |
| | | | 709/206 |
| 2008/0243472 A1* | 10/2008 | DeGroot | G06F 40/58 |
| | | | 704/2 |
| 2008/0262827 A1* | 10/2008 | DeGroot | G06F 40/45 |
| | | | 704/3 |
| 2009/0210214 A1* | 8/2009 | Qian | G06F 40/58 |
| | | | 704/2 |
| 2010/0036653 A1* | 2/2010 | Kim | G06F 40/58 |
| | | | 704/3 |
| 2010/0088085 A1* | 4/2010 | Jeon | G06F 40/44 |
| | | | 704/7 |
| 2011/0202512 A1* | 8/2011 | Pantanelli | G06F 40/30 |
| | | | 707/706 |
| 2011/0231792 A1* | 9/2011 | Tan | G06F 3/017 |
| | | | 715/810 |
| 2012/0005571 A1 | 1/2012 | Tang et al. | |
| 2012/0066237 A1* | 3/2012 | Chen | G06F 16/23 |
| | | | 707/754 |
| 2013/0211815 A1 | 8/2013 | Seligman et al. | |
| 2013/0262080 A1* | 10/2013 | Marciano | G06F 40/47 |
| | | | 704/3 |
| 2014/0303960 A1* | 10/2014 | Orsini | H04L 51/04 |
| | | | 704/2 |
| 2017/0344256 A1* | 11/2017 | Gnedin | G06Q 30/0241 |
| 2019/0205397 A1* | 7/2019 | Tanaka | H04L 67/104 |

* cited by examiner

INFORMATION DISPLAY METHOD, APPARATUS, AND DEVICES

CROSS REFERENCE TO RELATED PATENT APPLICATIONS

The present application claims priority to Chinese Application No. 201710916541.2, filed on Sep. 30, 2017 and entitled "INFORMATION DISPLAY METHOD, APPARATUS, AND DEVICES," which is incorporated herein by reference in its entirety.

TECHNICAL FIELD

The present disclosure relates to the field of Internet technologies, and in particular, to information display methods, and apparatuses, and devices.

BACKGROUND

IM (Instant Messaging) refers to a service that can instantly send and receive Internet messages. With the rapid development of Internet technologies, instant messaging has also been rapidly developed. The functions of instant messaging have become increasingly rich and have been developed into integrated information platforms integrating communication, information, entertainment, e-mails, blogs, music, televisions, games, search, e-commerce, office collaboration, enterprise customer services and the like.

The communication function of the instant messaging, that is, the instant chat function, allows users to communicate at anytime and anywhere. However, with globalization, the users may be distributed all over the world. There are various languages, and the users may use different languages during the chat. Therefore, a translation function guarantees normal communication among the users.

After receiving the information input by a user, a first client may send the complete input information to a server. The server translates the complete information and sends the complete translated information to a second client.

However, when inputting the information, the sender cannot know the translation result, resulting in poor user experience.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or processor-readable/computer-readable instructions as permitted by the context above and throughout the present disclosure.

The present disclosure provides an information display method, applied to a first client. The method includes providing an information editing interface; receiving a first type of information input by a user in the information editing interface; obtaining a second type of information corresponding to the first type of information, wherein the second type of information is translation information of the first type of information; and displaying the second type of information in the information editing interface.

The present disclosure provides an information display method, applied to a server. The method includes receiving a request message sent by a first client, wherein the request message includes a first type of information; obtaining a second type of information corresponding to the first type of information, wherein the second type of information is translation information of the first type of information; and returning to the first client a response message in response to the request message, wherein the response message includes the second type of information, so that the first client displays the second type of information in an information editing interface.

The present disclosure provides an information display apparatus applied to a first client. The apparatus includes a providing module configured to provide an information editing interface; a receiving module configured to receive a first type of information input by a user in the information editing interface; an obtaining module configured to obtain a second type of information corresponding to the first type of information, wherein the second type of information is translation information of the first type of information; and a display module configured to display the second type of information in the information editing interface.

The present disclosure provides an information display apparatus applied to a server. The apparatus includes a receiving module configured to receive a request message sent by a first client and including a first type of information; an obtaining module configured to obtain a second type of information corresponding to the first type of information, wherein the second type of information is translation information of the first type of information; and a sending module configured to return to the first client a response message in response to the request message, wherein the response message includes the second type of information, so that the first client displays the second type of information in an information editing interface.

The present disclosure provides a terminal device, including a receiver configured to provide an information editing interface and receive a first type of information input by a user in the information editing interface; a processor configured to obtain a second type of information corresponding to the first type of information, wherein the second type of information is translation information of the first type of information; and a display configured to display the second type of information in the information editing interface.

The present disclosure provides a server, including a receiver configured to receive a request message sent by a first client and including a first type of information; a processor configured to obtain a second type of information corresponding to the first type of information, wherein the second type of information is translation information of the first type of information; and a transmitter configured to return to the first client a response message in response to the request message, wherein the response message includes the second type of information, so that the first client displays the second type of information in an information editing interface.

Based on the foregoing technical solutions, in the embodiments of the present disclosure, when the user inputs information (such as the first type of information) in the information editing interface of the first client, the information input by the user in the information editing interface may be synchronously translated, and the translated information (such as the second type of information) is displayed to the user by the information editing interface, so that during the process when the user inputs the information in the information editing interface, the translation information of the currently input information may be seen in real time, and the translation information may be modified, thereby improving user experience.

BRIEF DESCRIPTION OF THE DRAWINGS

To illustrate technical solutions in the embodiments of the present disclosure more clearly, a brief introduction on the accompanying drawings which are needed in the description of the embodiments of the present disclosure is given below. Apparently, the accompanying drawings in the description below are merely some of the embodiments of the present disclosure, based on which other accompanying drawings may be obtained by those of ordinary skill in the art.

DETAILED DESCRIPTION

The terms used in the embodiments of the present disclosure are for the purpose of describing particular embodiments only and are not intended to limit the present disclosure. As used in the present disclosure and in the claims, the singular forms "a/an", "said" and "the" are intended to include the plural forms as well, unless the context clearly indicates otherwise. It should also be understood that the term "and/or" as used herein refers to any or all possible combinations including one or more associated listed items.

It should be understood that, although the terms first, second, third and the like may be used for describing various kinds of information in the embodiments of the present disclosure, the information should not be limited to these terms. These terms are only used for distinguishing the same type of information from one another. For example, first information may also be referred to as second information without departing from the scope of the present disclosure, and similarly, second information may also be referred to as first information. Depending on the context, in addition, the used word "if" may be interpreted as "at the time of . . . ," "when . . . ," or "in response to the determination."

In an embodiment of the present disclosure, an information display method is provided. The information display method may be applied to an instant messaging (IM) system, and the type of the instant messaging system is not limited as long as instant messaging can be implemented. The instant messaging system includes a server and two clients. The two clients are clients that communicate with each other. The client used by a sender is called a first client, the client used by a recipient is called a second client, and both the first client and the second client are clients for realizing the instant messaging function. Of course, the first client and the second client are relative. For example, when client 1 sends information to client 2, client 1 is the first client, and client 2 is the second client; and when client 2 sends the information to client 1, client 2 is the first client, and client 1 is the second client.

The first client/second client may be an APP (Application) on a terminal device (such as a mobile terminal, a PC (Personal Computer), a laptop, a smart phone or the like), or a browser on the terminal device, and the type of the client is not limited, and any client capable of implementing the instant messaging function is within the protection scope of the embodiments of the present disclosure.

The server may be a device that provides the instant messaging function, the information exchanged between the first client and the second client may be forwarded by the server, and the type of the server is not limited.

Figure 1:
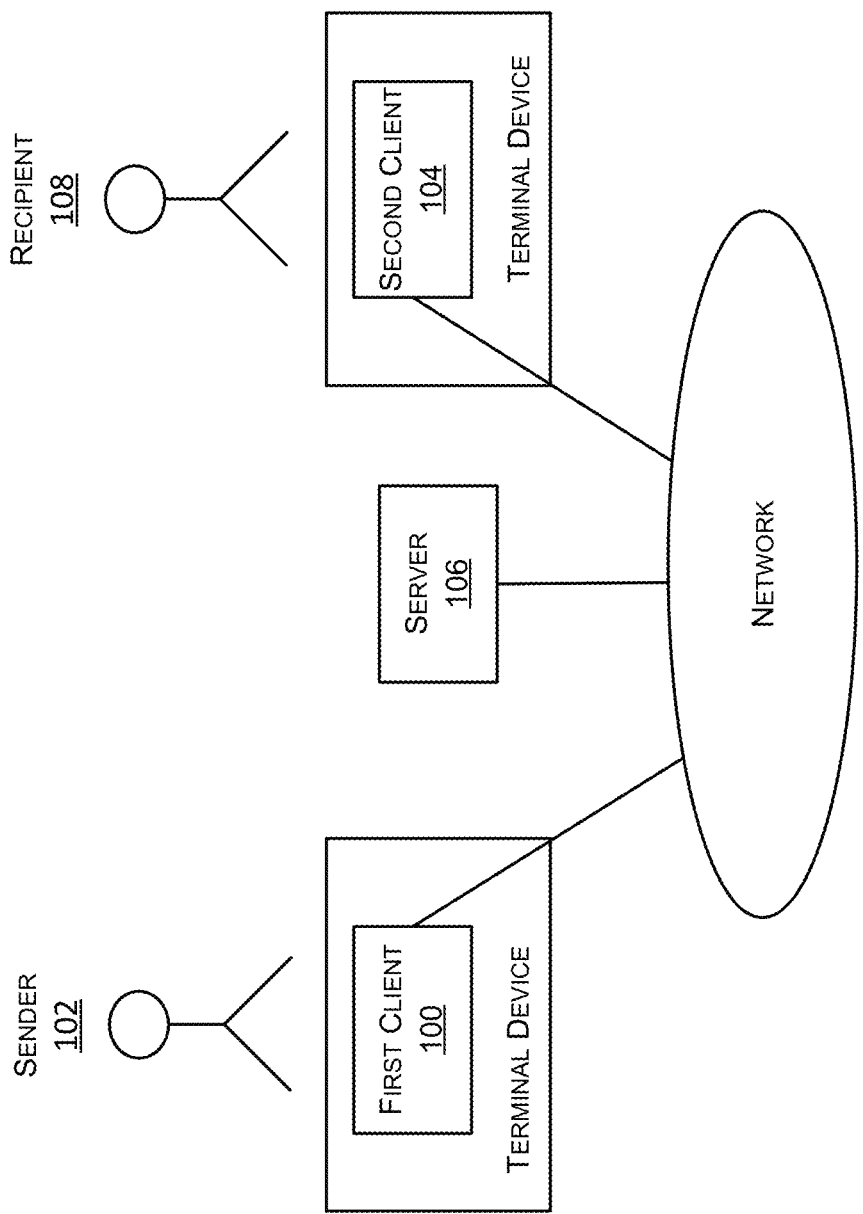
FIG. 1 is a schematic diagram of an application scenario of an embodiment of the present disclosure.

Referring to FIG. 1, which is a schematic diagram of an application scenario of an embodiment of the present disclosure, after the first client 100 receives information input by a user 102 (i.e., the sender), the first client 100 may send the complete information input by the user 102 to the second client 104. For example, the first client 100 may send the complete information to the second client 104 through the server 106, and the second client 104 displays the complete information to a user 108 (i.e., the recipient) after receiving the complete information.

With globalization, users may be distributed all over the world. There are various languages, and the users may use different languages when chatting. Therefore, a translation function guarantees normal communication among the users 102, 108. In order to realize the translation function, in an example, after receiving the information input by a user 102, the first client 100 may send the complete input information to the server 106, and the server 106 translates the complete information and sends the complete translated information to the second client 104. However, in the above-mentioned translation function, after the sender 102 sends the complete information to the server 106, the server 106 gives translation information at one time, and when the sender 102 inputs the information, the sender 102 cannot query the translation information in real time and cannot change the translation information, resulting in poor user experience.

In view of the above, in the embodiment of the present disclosure, when the first client 100 receives the information input by the sender 102, the first client 100 may directly translate the information input by the sender 102 and display the translation information to the sender 102, so that the sender 102 can know the translation information of the currently-input information and can modify the translation information, instead of the server 106 translating the complete information after the sender 102 inputs the complete information and sends the complete information to the server 106, so that the user experience may be improved.

Figure 2:
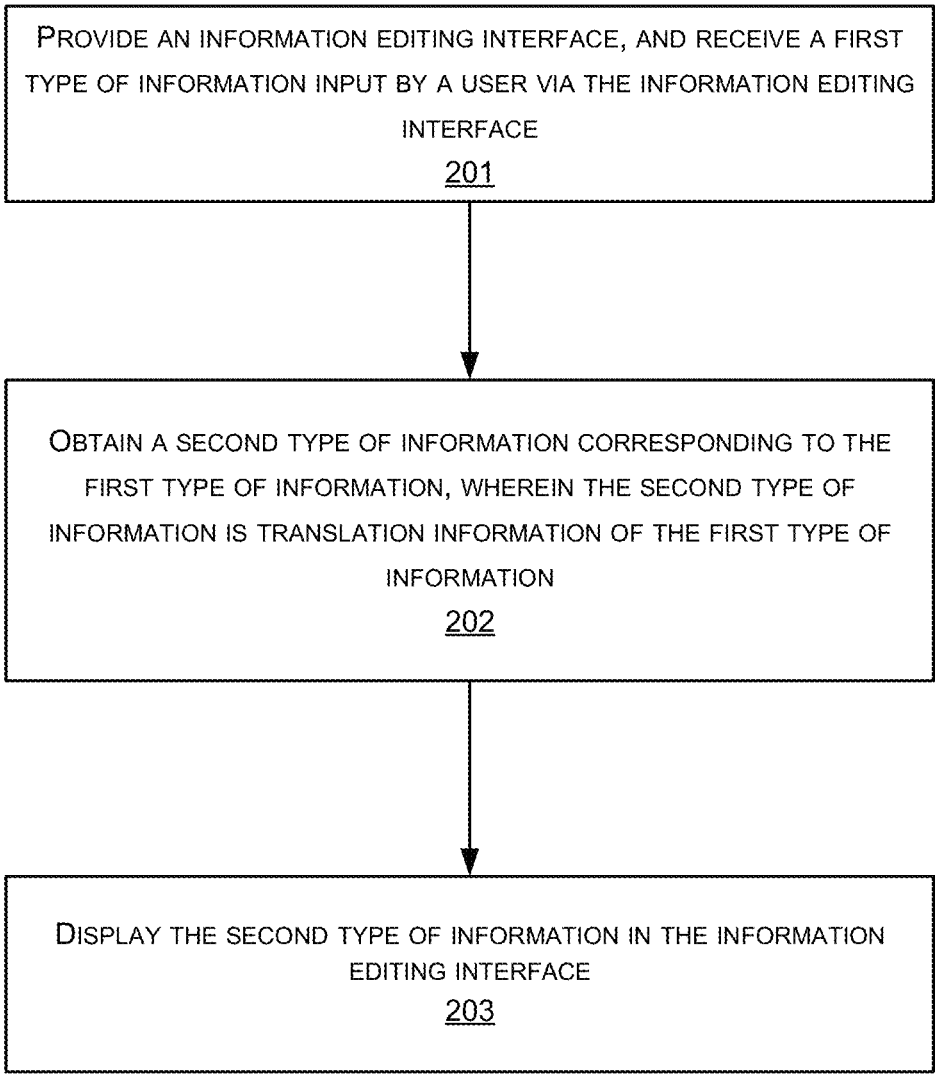
FIG. 2 is a flowchart of an information display method in an embodiment of the present disclosure.

In the above application scenario, referring to FIG. 2, which is a flowchart of an information display method provided in the embodiment of the present disclosure, the method may be applied to the first client, and the method may include the following steps:

Step 201: An information editing interface is provided, and a first type of information input by the user (i.e., the sender) in the information editing interface is received. The interface of the first client may include a session display interface and the information editing interface, the information editing interface may refer to an interface where the user may input information, and the user may edit the contents of the information editing interface. Therefore, the information editing interface may be specifically a session editing interface of the first client. In addition, the session display interface refers to an interface that is finally displayed on the first client, the contents of the session display interface cannot be edited, and the user can only view the contents of the session display interface.

The first type of information may include, but is not limited to, information input by the user (the sender) via the information editing interface before the first client receives a sending command. The first type of information may be a part or all of the complete information input by the user (i.e., the sender) via the information editing interface.

For example, if the information input by the sender to the recipient is "hi, I'm interested in this product," then the sender may input "hi, I'm interested in this product" in turn in the information editing interface of the first client, and after the input of the information is completed, the user clicks a send button or implements the function of clicking the send button through a shortcut key, and thus, the first client may receive the sending command and needs to send to the second client all the information, namely, "hi, I'm interested in this product," input by the sender in the information editing interface.

On this basis, after the first client receives the sending command (for example, a command generated by clicking the send button, or a command generated by the shortcut key for implementing the function of the send button), the first client may determine all the information, namely, "hi, I'm interested in this product," input by the sender in the information editing interface as the complete information. That is, the complete information is "hi, I'm interested in this product." Before the first client receives the sending command, the information input by the sender to the information editing interface is the first type of information. The first type of information may be a part or all of the above complete information, and as long as the sending command has not yet been received, each time the user inputs information, the first client determines the information input by the user via the information editing interface as the first type of information.

For example, in the process when the sender inputs the complete information "hi, I'm interested in this product" in the information editing interface, after the sender inputs "hi" in the information editing interface, the first client determines that the first type of information is "hi;" after the sender inputs "hi, I" in the information editing interface, the first client determines that the first type of information is "hi, I;" after the sender inputs "hi, I'm" in the information editing interface, the first client determines that the first type of information is "hi, I'm;" and, by analogy, when the sender inputs "hi, I'm interested in this product" in the information editing interface, the first client determines that the first type of information is "hi, I'm interested in this product." In summary, each time the sender inputs the information, the first client determines all the information that has been input via the information editing interface as the first type of information until the first client receives the sending command, and then the first client no longer determines the first type of information, but rather sends the information that has been input into the first client.

Step 202: A second type of information corresponding to the first type of information is obtained, wherein the second type of information is translation information of the first type of information. The first type of information and the second type of information may be information in different languages, that is, the language of the first type of information is different from the language of the second type of information; or, the first type of information and the second type of information may be information in the same language, but the first type of information and the second type of information have different forms of expressions, for example, the first type of information is simplified Chinese, and the second type of information is traditional Chinese. Of course, only two examples are given in the above process, and as long as the second type of information is the translation information of the first type of information, the translation mode is not limited herein.

In one example, the process of "obtaining the second type of information corresponding to the first type of information" may include: preprocessing the first type of information, and obtaining the second type of information corresponding to the preprocessed first type of information. Specifically, if the first type of information input by the sender cannot be translated directly, for example, if there is a space, a line break, an emoticon or the like in the first type of information, the first client may preprocess the first type of information, such as remove the space, the line break, the emoticon and other content, to obtain the preprocessed first type of information, and obtain the second type of information corresponding to the preprocessed first type of information. If the first type of information input by the sender may be directly translated, for example, the first type of information does not contain any space, line break, emoticon or the like, the first client may directly obtain the second type of information corresponding to the first type of information input by the sender.

In one example, the process of "obtaining the second type of information corresponding to the first type of information" may include, but is not limited to: if the first client supports a translation preposition function, obtaining the second type of information corresponding to the first type of information. Specifically, after receiving the first type of information, the first client may also determine whether the first client supports the translation preposition function, if yes, executes the process of obtaining the second type of information corresponding to the first type of information, otherwise, adopts the traditional process for processing, and the processing process is not limited herein.

In one example, the process of "obtaining the second type of information corresponding to the first type of information" may include, but is not limited to: first mechanism: obtaining language information of a second client communicating with the first client; and translating the first type of information according to the language information to obtain the second type of information; second mechanism: obtaining language information of a second client communicating with the first client; sending a request message to a server, wherein the request message may include the language information and the first type of information; receiving a response message returned by the server in response to the request message, wherein the response message may include the second type of information obtained when the server translates the first type of information according to the language information; and obtaining the second type of information corresponding to the first type of information from the response message.

In the process when the sender inputs the information in the information editing interface (an input box) of the first client, the first client can intercept the information in real time, that is, receive the first type of information input by the sender in the information editing interface, and then obtain the second type of information corresponding to the first type of information. Further, the first client may use the above first mechanism or second mechanism to obtain the second type of information corresponding to the first type of information, wherein in the first mechanism, the first client translates the first type of information, and in the second mechanism, the server translates the first type of information.

In order to obtain the second type of information corresponding to the first type of information, the first client may obtain the language information corresponding to the second client. Specifically, in the instant messaging process between the first client and the second client, the first client may send the language information of the first client to the second client, and the second client may send the language information of the second client to the first client. Therefore, the first client may obtain the language information corresponding to the second client, and translate the first type of information based on the language information.

The language information corresponding to the first client is a language (for the convenience of distinguishing, the language is referred to as a first language) of the information input by the sender, and the language information corresponding to the second client is a language (for the convenience of distinguishing, the language is referred to as a second language) of the information input by the recipient. The first language and the second language are different from each other, the type of the first language/second language is not limited herein, and the first language/second language is related to the language habits of the user. For example, the type of the language may include, but is not limited to: Chinese, English, German, French, Russian, Arabic, Spanish, Polish, Japanese, Korean, etc.

In the first mechanism, a translation database may be locally preconfigured in the first client. The first client may translate the first type of information based on the translation database to obtain the second type of information. The second type of information is the translation information of the first type of information, moreover, the language of the first type of information is the above-mentioned first language, the language of the second type of information is the above-mentioned second language, and the first language is different from the second language. When the first type of information is translated, the first type of information in the first language is translated into the second type of information in the second language, and the translation process is not limited herein. Moreover, if the first type of information does not need to be preprocessed, the first client may directly translate the first type of information input by the sender, and if the first type of information needs to be preprocessed, the first client may translate the preprocessed first type of information.

In the second mechanism, the first client does not translate the first type of information locally, but sends the first type of information to the server, and the server translates the first type of information and returns the translation information to the first client. Specifically, the first client may send a request message to the server, and the request message may include the first of type information and the language information (i.e., the second language corresponding to the second client). If the first type of information does not need to be preprocessed, the first type of information included in the request message is the first type of information input by the sender; if the first type of information needs to be preprocessed, the first type of information included in the request message is the preprocessed first type of information (in this case, the server does not preprocess the first type of information included in the request message). Of course, the first type of information included in the request message may also be the first type of information input by the sender (in this case, the server needs to preprocess the first type of information included in the request message).

After receiving the request message, the server parses the first type of information and the language information (i.e., the second language corresponding to the second client) from the request message, and translates the first type of information according to the locally preconfigured translation database to obtain the second type of information. The second type of information is the translation information of the first type of information, the language of the first type of information is the above-mentioned first language, the language of the second type of information is the above-mentioned second language, and the first language is different from the second language. When the first type of information is translated, the server translates the first type of information in the first language into the second type of information in the second language, and the translation process is not limited herein.

Then, the server sends a response message to the first client, and the response message includes the second type of information. The first client receives the response message returned by the server in response to the request message, and obtains the second type of information corresponding to the first type of information from the response message, that is, the translation information corresponding to the first type of information.

With the second mechanism, the first client may preprocess the first type of information and send the preprocessed first type of information to the server. Therefore, the server may directly translate the received first type of information without preprocessing the received first type of information, so that the translation speed may be accelerated.

With the second mechanism, a persistent connection may be established between the first client and the server. Based on this, the first client may send the request message to the server over the persistent connection, and the server may receive the request message sent by the first client over the persistent connection. In addition, the server may send the response message to the first client over the persistent connection, and the first client may receive the response message returned by the server over the persistent connection.

The persistent connection refers to that, over one connection, multiple data packets may be sent continuously instead of disconnecting the connection between the first client and the server every time a data packet is sent. The type of the persistent connection may include, but is not limited to: a socket connection. The mechanism of establishing the persistent connection between the first client and the server is not limited. Since messages need to be frequently transmitted between the first client and the server, the transmission delay of the messages may be shortened by using the persistent connection to transmit the request message and the response message.

Step 203: The second type of information is displayed in the information editing interface. For example, the second type of information is displayed in the information editing interface of the first client, so that the translation information (i.e., the second type of information) is displayed to the sender in real time.

For example, using an example that the first type of information is Chinese and the second type of information is English, if the first type of information is "嗨," the second type of information displayed to the user in real time is "hi;" if the first type of information is "嗨 我" the second type of information displayed to the user in real time is "hi, I;" and by analogy, if the first type of information is "嗨 我对这个产品感兴趣." the second type of information displayed to the user in real time is "hi, I'm interested in this product."

In one example, after the first client displays the second type of information in the information editing interface, if the first client receives an operation command for the second type of information input by the user in the information editing interface, the first client may modify the second type of information according to the operation command to obtain the modified second type of information. In addition, if the operation command for the second type of information input by the user in the information editing interface is not received, the second type of information may remain unchanged.

For example, after the first client displays the second type of information "hi, I'm interested in this product" to the sender through the information editing interface in real time, if the sender needs to modify the second type of information, the sender may modify the second type of information in the information editing interface, for example, modify the second type of information as "I'm interested in this product." Based on this, the first client may receive the operation command for the second type of information through the information editing interface, and modify the second type of information according to the operation command to obtain the modified second type of information "I'm interested in this product."

In addition, after the first client displays the second type of information "hi, I'm interested in this product" to the sender in real time, if the sender does not need to modify the second type of information, the first client will not receive the operation command for the second type of information, and thus the second type of information may be kept unchanged.

The above process is a process of real-time translation of the information input by the sender before the first client receives the sending command (such as a command generated by clicking the send button, or a command generated by a shortcut key for implementing the function of the send button). After receiving the sending command, the first client may send to a second client all the second type of information corresponding to the first type of information (i.e., the above complete information) input via the information editing interface, or may send all the first type of information input via the information editing interface and all the second type of information corresponding to the first type of information to the second client. Of course, in practical application, the first client may also send all the first type of information input via the information editing interface to the server, and the server translates all the first type of information and sends the translated second type of information to the second client.

For example, after receiving the sending command, the first client may send to the second client all the first type of information, that is, "请 我对这个产品感兴趣" input by the sender and all the second type of information, that is, "hi, I'm interested in this product" or "I'm interested in this product," corresponding to the first type of information. Or, the first client may also only send all the second type of information, that is, "hi, I'm interested in this product" or "I'm interested in this product" corresponding to the first type of information to the second client.

In one example, the foregoing execution sequence is just an example provided for the convenience of the description. In actual application, the execution sequence of the steps may also be changed, and the execution sequence is not limited. Moreover, in other embodiments, the steps of the corresponding method are not necessarily executed in the sequence as shown and described in the specification, and the method may include more or fewer steps than those described herein. In addition, the single step described in the specification may be decomposed into multiple steps for description in other embodiments; and the multiple steps described in the present specification may also be combined into a single step for description in other embodiments.

Based on the foregoing technical solutions, in the embodiment of the present disclosure, when the user inputs information (such as the first type of information) in the information editing interface of the first client, the information input by the user in the information editing interface may be synchronously translated, and the translated information (such as the second type of information) may be displayed to the user through the information editing interface. Therefore, the user sees the translation information of the currently input information in real time in the process of inputting the information in the information editing interface, and may also modify the translation information, and, in this way, the user experience is improved.

Figure 3:
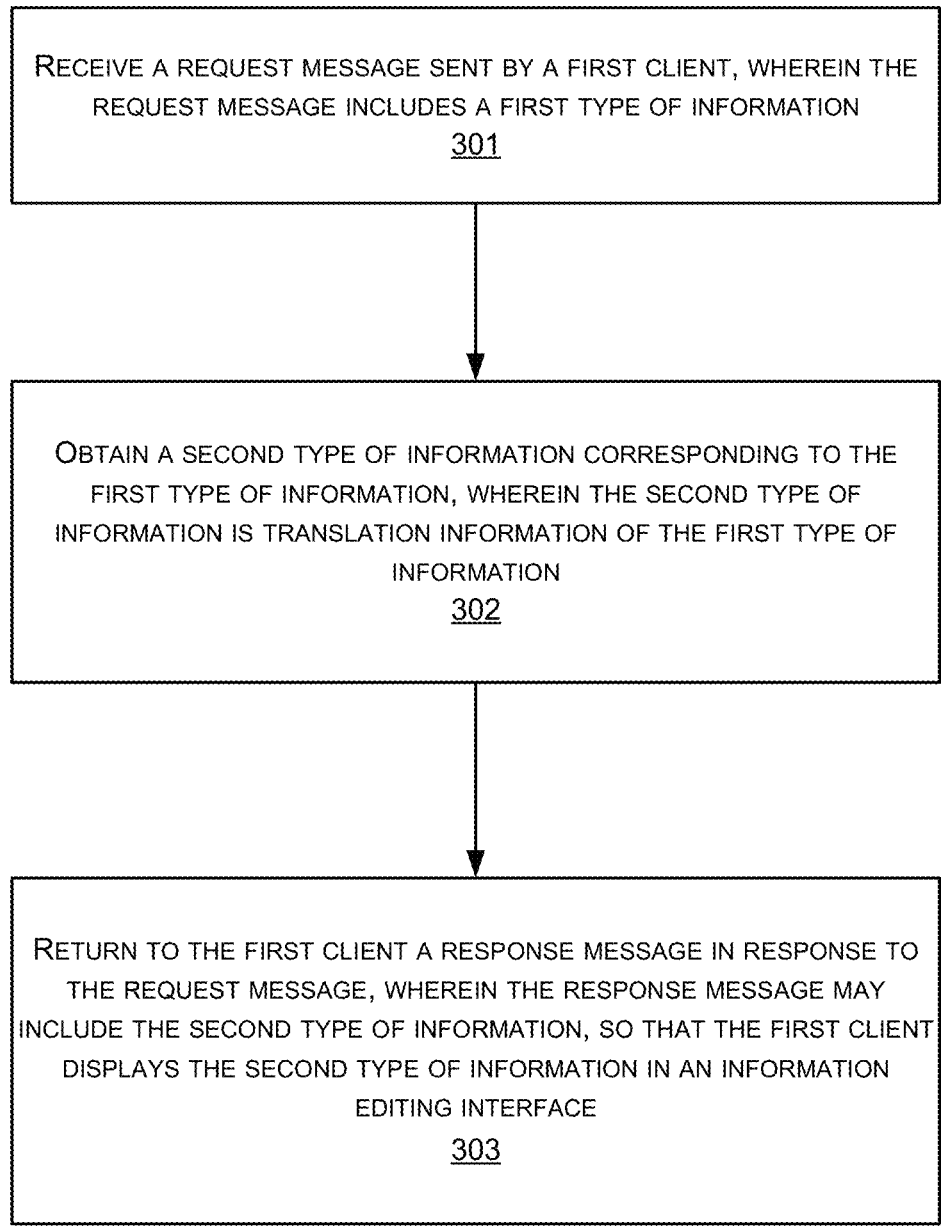
FIG. 3 is a flowchart of an information display method in another embodiment of the present disclosure.

Based on the same application idea as the above method, the embodiment of the present disclosure further provides another information display method, which may be applied to a server. Referring to FIG. 3, which is a flowchart of the method, the method may include:

Step 301: A request message sent by a first client is received, the request message including a first type of information.

The first type of information may include, but is not limited to, information input by the user (the sender) via the information editing interface of the first client before the first client receives a sending command. The first type of information may be a part or all of the complete information input by the user to the information editing interface of the first client.

Step 302: A second type of information corresponding to the first type of information is obtained, the second type of information being translation information of the first type of information, wherein the first type of information and the second type of information may be information in different languages. That is, the language of the first type of information is different from the language of the second type of information; or, the first type of information and the second type of information may be information in the same language, but the first type of information and the second type of information have different forms of expression. For example, the first type of information is simplified Chinese, and the second type of information is traditional Chinese. Of course, only two examples are provided in the above process, and as long as the second type of information is the translation information of the first type of information, the translation mode is not limited herein.

The request message may also include the language information of the second client communicating with the first client. Based on this, the process of "obtaining the second type of information corresponding to the first type of information" may include, but is not limited to: translating the first type of information according to the language information to obtain the second type of information.

Step 303: A response message in response to the request message is returned to the first client, wherein the response message may include the second type of information, so that the first client displays the second type of information in the information editing interface.

A persistent connection is established between the server and the first client; wherein the server receives the request message sent by the first client through the persistent connection, and the server sends the response message to the first client through the persistent connection.

The flow shown in FIG. 3 is similar to the flow shown in FIG. 2, and details are not repeated herein.

Based on the foregoing technical solutions, in the embodiment of the present disclosure, when the user inputs information (such as the first type of information) in the information editing interface of the first client, the information input by the user in the information editing interface may be synchronously translated, and the translated information (such as the second type of information) may be displayed to the user through the information editing interface. Therefore, the user sees the translation information of the currently input information in real time in the process of inputting the information in the information editing interface, and may also modify the translation information, and, in this way, the user experience is improved.

Figure 4A:
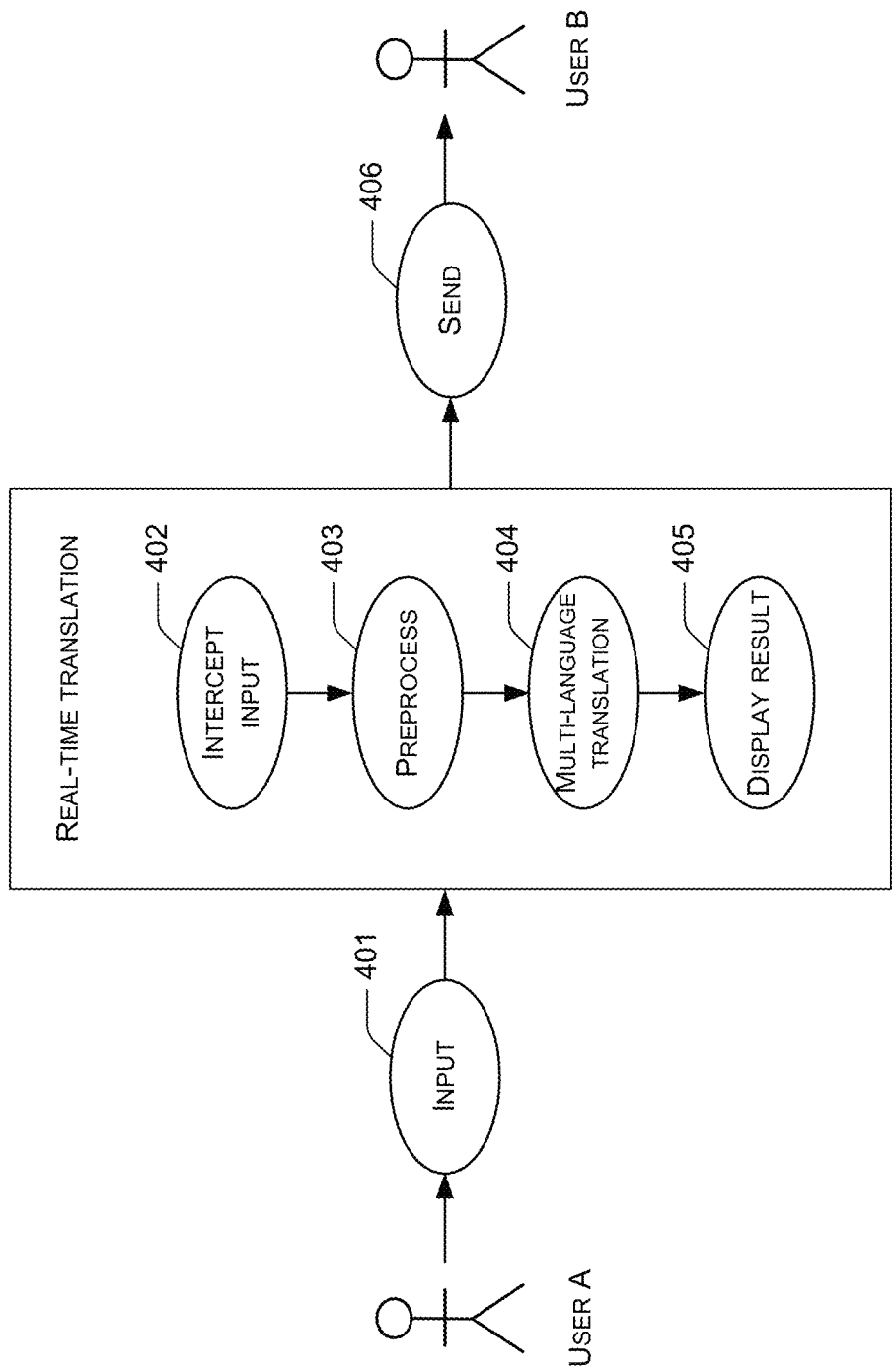
FIG. 4A to FIG. 4C are schematic diagrams of application scenarios of an embodiment of the present disclosure.

Referring to FIG. 4A, which is a schematic diagram of an example of the above information display method, after user A inputs the information in the information editing interface of the first client (401), the first client may perform real-time translation on the information, and in the translation process, the first client may intercept the input information (402), preprocess the input information (403), then translate the preprocessed information in multiple languages (404), and display results in the information editing interface (405). Finally, the translation information may be sent to user B (406).

Figure 4B:
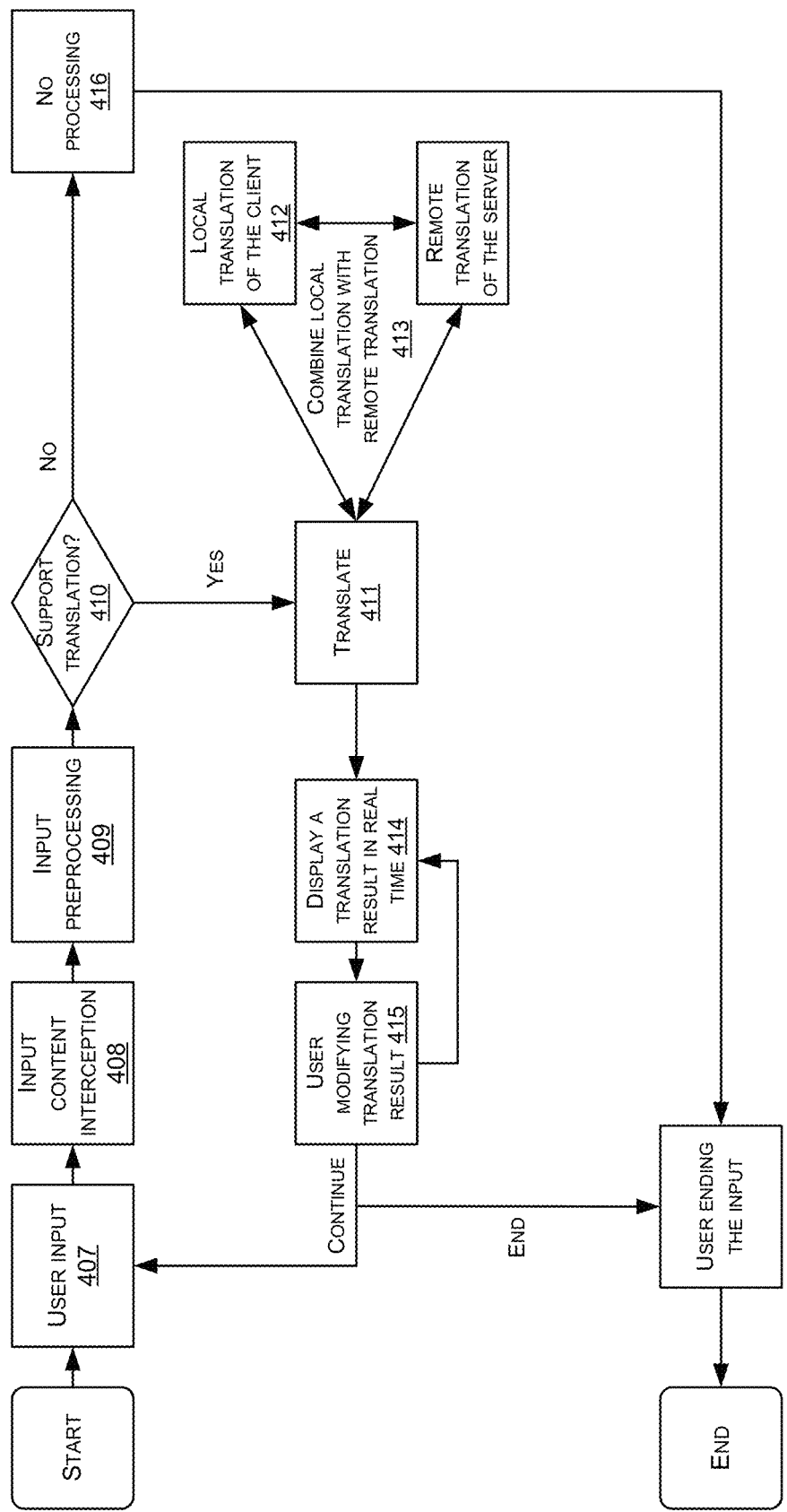

Referring to FIG. 4B, which is a schematic diagram of detailed flow of the above information display method. First, the sender inputs the information in the information editing interface of the client (407), and the client may intercept the content input by the sender (408).

Input preprocessing is executed (409). Specifically, the content input by the user may not be directly translated. Therefore, the client may perform preprocessing, such as removing extra spaces, line breaks, emoticons, and the like.

Whether translation is supported is determined (410). If translation is supported, the translation process is executed (411); otherwise, no processing is performed (416).

The translation process is executed (411). Specifically, the preprocessed information may be translated in the client locally (412) and may also be translated by the cooperation of the client and the server (413), and the translation mode is not limited.

Figure 4C:
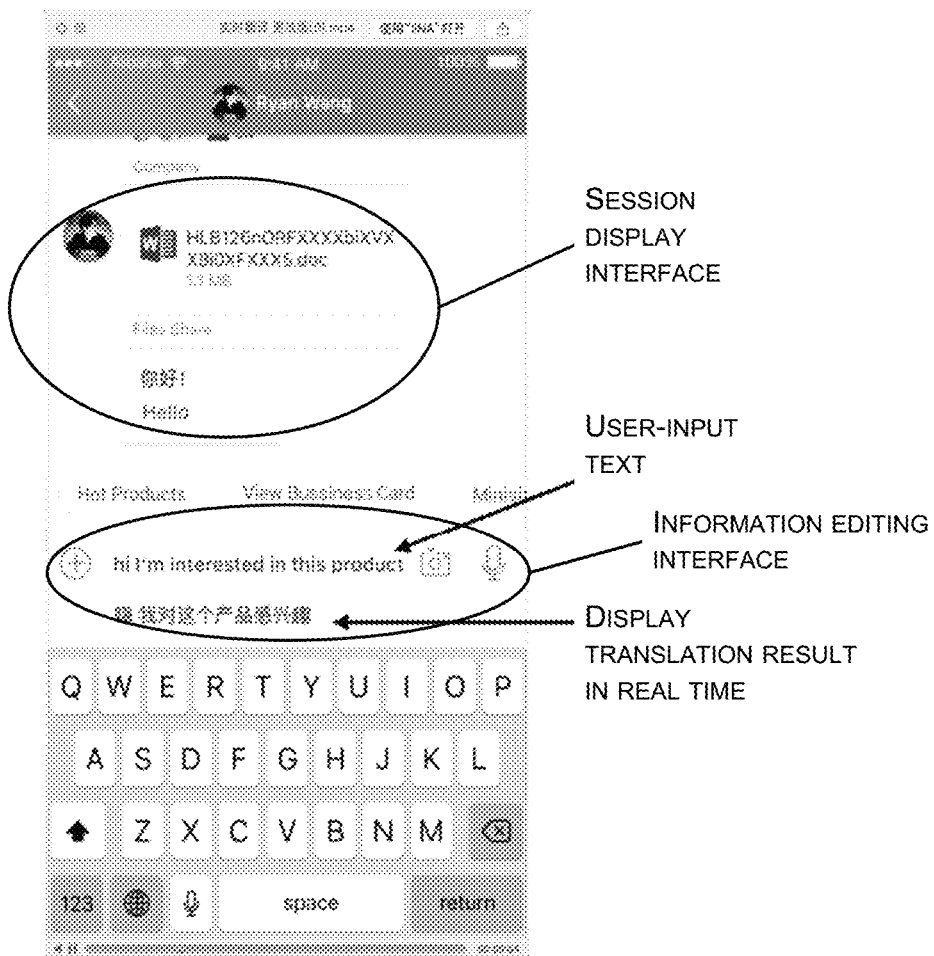

The translation information is displayed in real time (414). As shown in FIG. 4C, it is an example of a schematic diagram of an interface displayed in real time.

The user modifies the translation information (415). After the user sees the translation information, the user may modify the translation information.

As the user continues to input and edit the information, the above steps may be repeated to achieve a translation preposition function.

Figure 5:
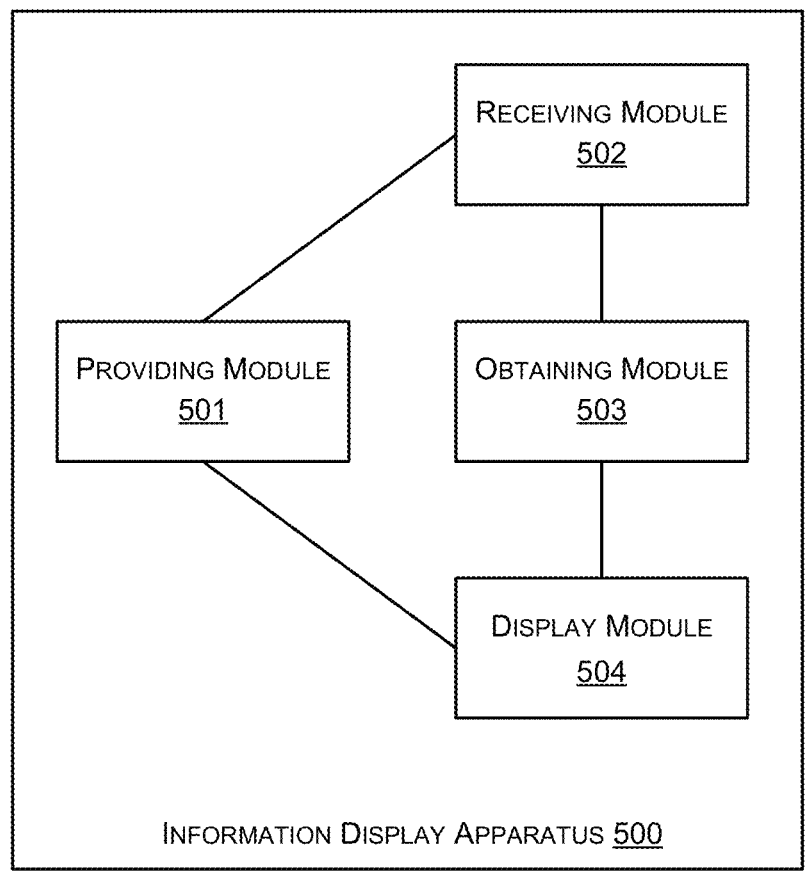
FIG. 5 is a structural diagram of an information display apparatus in an embodiment of the present disclosure.

Based on the same application idea as the above method, the embodiment of the present disclosure further provides an information display apparatus. The apparatus may be applied to a first client, as shown in FIG. 5, which is a structural diagram of the apparatus 500, and the apparatus 500 includes a providing module 501 configured to provide an information editing interface; a receiving module 502 configured to receive a first type of information input by a user in the information editing interface; an obtaining module 503 configured to obtain a second type of information corresponding to the first type of information, wherein the second type of information is translation information of the first type of information; and a display module 504 configured to display the second type of information in the information editing interface.

The obtaining module 503 is specifically used for obtaining language information of a second client communicating with the first client in a process of obtaining the second type of information corresponding to the first type of information; translating the first type of information according to the language information to obtain the second type of information; or, obtaining language information of a second client communicating with the first client; sending a request message to a server, wherein the request message includes the language information and the first type of information; receiving a response message returned by the server in response to the request message, wherein the response message includes the second type of information obtained when the server translates the first type of information according to the language information; and obtaining the second type of information corresponding to the first type of information from the response message.

A persistent connection may be established between the first client and the server; and further, the first client may send the request message to the server over the persistent connection, and the first client may receive the response message returned by the server over the persistent connection.

In one example, the receiving module 501 is further used for receiving an operation command for the second type of information input by the user in the information editing interface, and modifying the second type of information according to the operation command to obtain the modified second type of information.

In one example, the first type of information may include, but is not limited to, information input by the user via the information editing interface before the first client receives a sending command. In addition, the first type of information may also include a part or all of the complete information input by the user via the information editing interface.

The obtaining module 502 is configured to preprocess the first type of information in the process of obtaining the second type of information corresponding to the first type of information; and obtain the second type of information corresponding to the preprocessed first type of information.

The obtaining module 502 is configured to obtain the second type of information corresponding to the first type of information in the process of obtaining the second type of information corresponding to the first type of information if the first client supports a translation preposition function.

In one example, the information display apparatus 500 may further include (not shown in the figure): a sending module configured to send to a second client all the second type of information corresponding to the first type of information input via the information editing interface after receiving the sending command, or, send, to the second client, all the first type of information input via the information editing interface and all the second type of information corresponding to the first type of information.

Based on the same application idea as the above method, the embodiment of the present disclosure further provides a terminal device. The terminal device includes a first client, the terminal device may include: a receiver configured to provide an information editing interface and receive a first type of information input by a user in the information editing interface; a processor configured to obtain a second type of information corresponding to the first type of information, wherein the second type of information is translation information of the first type of information; and a display configured to display the second type of information in the information editing interface.

Based on the same application idea as the above method, the embodiment of the present disclosure further provides a non-transitory machine readable storage medium. The non-transitory machine readable storage medium stores a plurality of computer instructions, and the computer instructions perform the following processing when executed: providing an information editing interface, and receiving a first type of information input by a user via the information editing interface; obtaining a second type of information corresponding to the first type of information, wherein the second type of information is translation information of the first type of information; and displaying the second type of information in the information editing interface.

Figure 6:
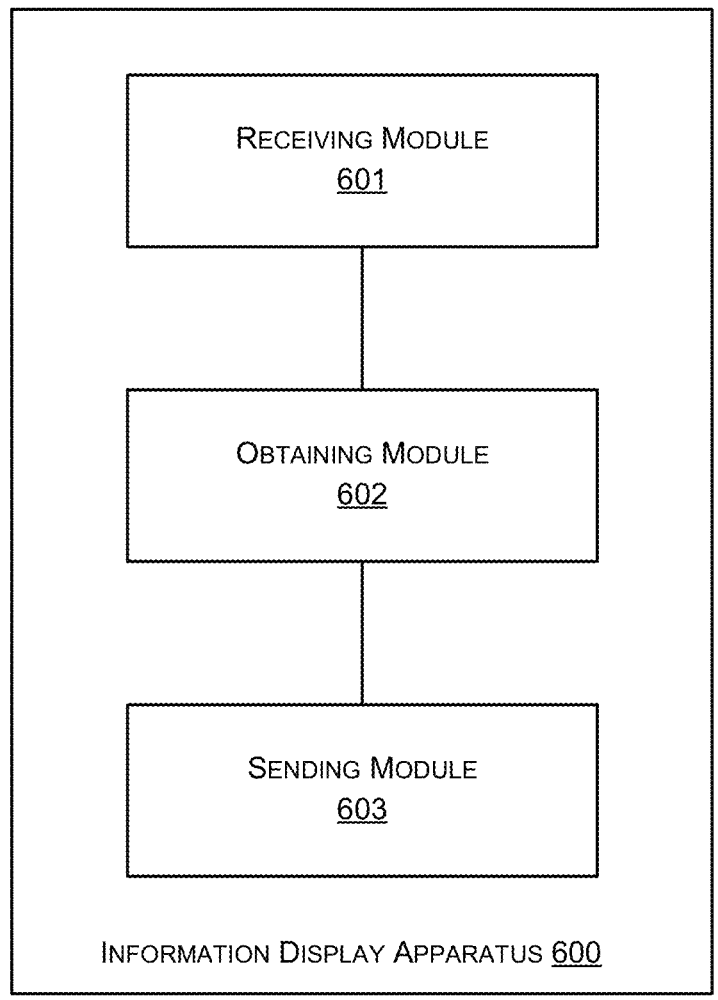
FIG. 6 is a structural diagram of an information display apparatus in another embodiment of the present disclosure.

Based on the same application idea as the above method, the embodiment of the present disclosure further provides an information display apparatus. The apparatus may be applied to a server, as shown in FIG. 6, which is a structural diagram of the apparatus 600, and the apparatus 600 includes a receiving module 601 configured to receive a request message sent by a first client and including a first type of information; an obtaining module 602 configured to obtain a second type of information corresponding to the first type of information, wherein the second type of information is translation information of the first type of information; and a sending module 603 configured to return to the first client a response message in response to the request message, wherein the response message includes the second type of information, so that the first client displays the second type of information in an information editing interface.

The request message further includes language information of a second client communicating with the first client; and the acquisition module 602 is configured to translate the first type of information according to the language information in the process of obtaining the second type of information corresponding to the first type of information to obtain the second type of information.

In one example, the first type of information includes, but is not limited to, information input by the user via the information editing interface before the first client receives a sending command. In addition, the first type of information may also include a part or all of the complete information input by the user via the information editing interface of the first client.

In one example, a persistent connection may also be established between the server and the first client; and, the server may receive the request message sent by the first client over the persistent connection, and the server may send the response message to the first client over the persistent connection.

Based on the same application idea as the above method, the embodiment of the present disclosure further provides a server. The server may include, but is not limited to: a receiver configured to receive a request message sent by a first client and including a first type of information; a processor configured to obtain a second type of information corresponding to the first type of information, wherein the second type of information is translation information of the first type of information; and a transmitter configured to return a response message in response to the request message to the first client, wherein the response message includes the second type of information, so that the first client displays the second type of information in an information editing interface.

Based on the same application idea as the above method, the embodiment of the present disclosure further provides a non-transitory machine readable storage medium that may be applied to a server. The non-transitory machine readable storage medium stores a plurality of computer instructions, and the computer instructions perform the following processing when executed: receiving a request message sent by a first client and including a first type of information; obtaining a second type of information corresponding to the first type of information, wherein the second type of information is translation information of the first type of information; and returning to the first client a response message in response to the request message, wherein the response message includes the second type of information, so that the first client displays the second type of information in an information editing interface.

The systems, apparatuses, modules, or units set forth in the above embodiments may be specifically implemented by computer chips or devices, or may be implemented by a product having certain functions. A typical implementation device is a computer, the specific form of the computer may be a personal computer, a laptop computer, a cellular phone, a camera phone, a smart phone, a personal digital assistant, a media player, a navigation device, an email sending and receiving device, a game control console, a tablet computer, a wearable device, or the combination of any of these devices.

Figure 7:
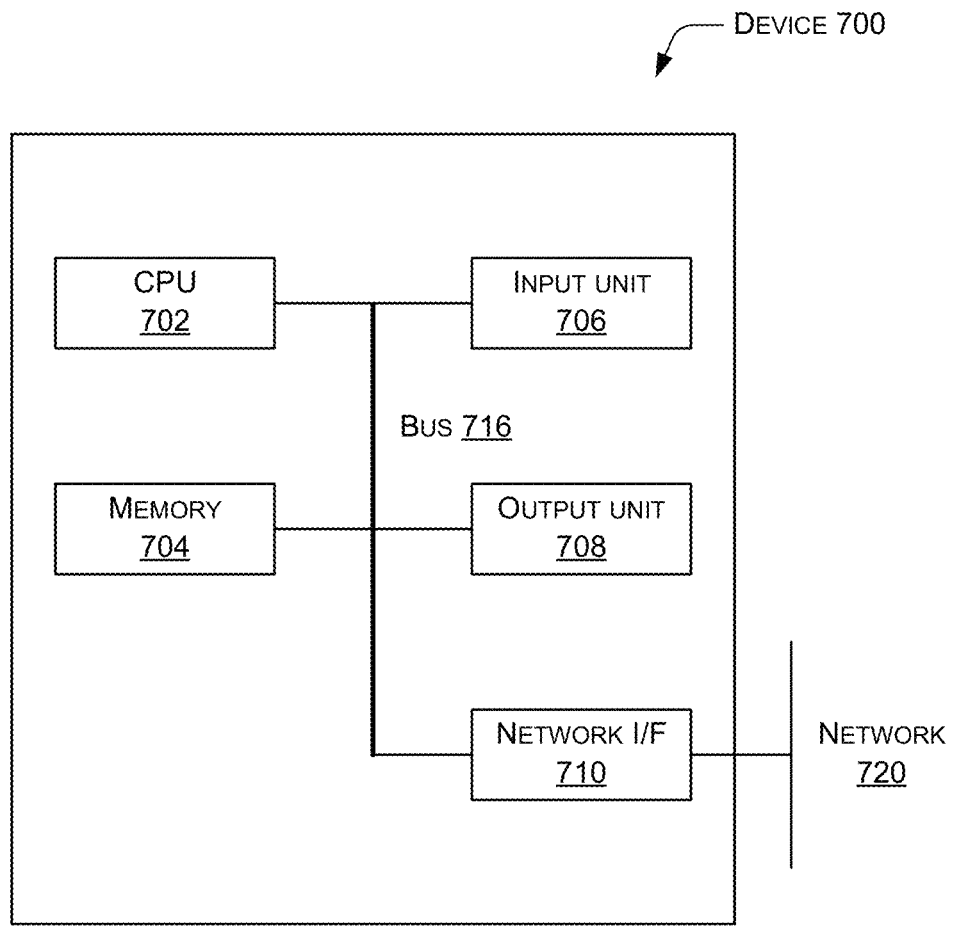
FIG. 7 is a block diagram illustrating an exemplary computer in which embodiments of the disclosure can be implemented.

FIG. 7 illustrates the exemplary components of a computer 700 which can be any of the devices, servers, clients, terminals, terminal devices, and apparatuses described in the embodiments above. The computer 700 can include a central processing unit (CPU) 702, memory 704, an input unit 706, an output unit 708, and a network interface 710, all connected to a bus 716. The network interface 710 allows the computer 700 to connect to a network 720. The memory 704 can store the one or more illustrated modules of FIGS. 5 and 6 and/or instructions for carrying out the methods disclosed in the embodiments above. The input unit 706 can receive user input or data. The network interface 710 allows computer 710 to communicate with one or more of the other computers on the network.

Any other types of computer readable media can also be used for storing the software product. The software product, when executed by a processor, can perform the methods disclosed in the embodiments above. The computer readable media may include a volatile or non-volatile type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

For the convenience of description, the above apparatus is described by dividing the same into various units according to the functions. Of course, the functions of the units may be implemented in the same or multiple software and/or hardware during the implementation of the present disclosure.

Those skilled in the art should understand that the embodiment of the present disclosure may be provided as a method, a system or a computer program product. Thus, the present disclosure may take the form of an entirely hardware embodiment, an entirely software embodiment or an embodiment combining software and hardware. Moreover, the embodiment of the present disclosure may take the form of a computer program product implemented on one or more computer-usable storage media (including, but not limited to, disk memories, CD-ROMs, optical memories) containing computer-usable program codes.

The present disclosure is described with reference to flowcharts and/or block diagrams of methods, devices (systems) and computer program products in accordance with the embodiments of the present disclosure. It should be understood that computer program instructions may implement each flow and/or block in the flowchart and/or the block diagram and the combination of the flows and/or blocks in the flowchart and/or the block diagram. These computer program instructions may be provided to a general-purpose computer, a special-purpose computer, an embedded processor or a processor of other programmable data processing device to generate a machine, such that the instructions executed by the computer or the processor of the other programmable data processing device generate apparatuses used for achieving specified functions in one or more flows of the flowchart and/or one or more blocks of the block diagram.

Moreover, these computer program instructions may also be stored in a computer readable memory capable of guiding the computer or the other programmable data processing device to work in a particular manner, such that the instructions stored in the computer readable memory generate a manufactured product including an instruction apparatus, and the instruction apparatus achieves the specified functions in the one or more flows of the flowcharts and/or one or more blocks of the block diagrams.

These computer program instructions may also be loaded to the computer or the other programmable data processing device, to execute a series of operation steps on the computer or the other programmable data processing device to produce processing achieved by a computer, such that the instructions executed on the computer or the other programmable data processing device provide steps used for achieving the specified functions in one or more flows of the flowchart and/or one or more blocks of the block diagram.

In an aspect of the disclosure, a terminal device is disclosed. The terminal device includes: a receiver configured to provide an information editing interface and receiving a first type of information input by a user in the information editing interface; a processor configured to obtain a second type of information corresponding to the first type of information, wherein the second type of information comprises translation information of the first type of information; and a display configured to display the second type of information in the information editing interface.

In another aspect of the disclosure, a server is disclosed. The server includes: a receiver configured to receive a request message sent by a first client and comprising a first type of information; a processor configured to obtain a second type of information corresponding to the first type of information, wherein the second type of information comprises translation information of the first type of information; and a transmitter configured to return a response message to the first client in response to the request message, wherein the response message comprises the second type of information, so that the first client displays the second type of information in an information editing interface.

In yet another aspect of the disclosure, an information display apparatus applied to a server is disclosed. The information display apparatus includes: a receiving module configured to receive a request message sent by a first client and including a first type of information; an obtaining module configured to obtain a second type of information corresponding to the first type of information, wherein the second type of information is translation information of the first type of information; and a sending module configured to return a response message to the first client in response to the request message, wherein the response message comprises the second type of information, so that the first client displays the second type of information in an information editing interface.

Described above are only embodiments of the present disclosure, which are not intended to limit the present disclosure. For those skilled in the art, the present disclosure may have various changes and variations. Any modifications, equivalent replacements, improvements and the like made within the spirit and principle of the present disclosure should be encompassed within the scope of the claims of the present disclosure.

The present disclosure can be further understood using the following clauses.

Clause 1: An information display method, applied to a first client, comprising: providing an information editing interface; receiving a first type of information input by a user in the information editing interface; obtaining a second type of information corresponding to the first type of information, wherein the second type of information is translation information of the first type of information; and displaying the second type of information in the information editing interface.

Clause 2: The method according to Clause 1, wherein the first type of information comprises information input by the user via the information editing interface before the first client receives a sending command.

Clause 3: The method according to Clause 1, wherein the first type of information comprises a part or all of the complete information input by the user via the information editing interface.

Clause 4: The method according to Clause 1, wherein the process of obtaining the second type of information corresponding to the first type of information specifically comprises: preprocessing the first type of information; and obtaining the second type of information corresponding to the preprocessed first type of information.

Clause 5: The method according to Clause 1 or 4, wherein the process of obtaining the second type of information corresponding to the first type of information specifically comprises: obtaining language information of a second client communicating with the first client; and translating the first type of information according to the language information to obtain the second type of information.

Clause 6: The method according to Clause 1 or 4, wherein the process of obtaining the second type of information corresponding to the first type of information specifically comprises: obtaining language information of a second client communicating with the first client; sending a request message to a server, wherein the request message carries the language information and the first type of information; receiving a response message for the request message returned by the server, wherein the response message comprises the second type of information obtained when the server translates the first type of information according to the language information; and obtaining the second type of information corresponding to the first type of information from the response message.

Clause 7: The method according to Clause 6, wherein a long connection is established between the first client and the server; and the first client sends the request message to the server over the long connection, and the first client receives the response message returned by the server over the long connection.

Clause 8: The method according to Clause 1 or 4, wherein the process of obtaining the second type of information corresponding to the first type of information specifically comprises: if the first client supports a translation preposition function, obtaining the second type of information corresponding to the first type of information.

Clause 9: The method according to Clause 1, wherein after the displaying the second type of information in the information editing interface, the method further comprises: receiving an operation command for the second type of information input by the user via the information editing interface; and modifying the second type of information according to the operation command to obtain the modified second type of information.

Clause 10: The method according to Clause 1 or 9, further comprising: sending the second type of information corresponding to all the first type of information input to the information editing interface to a second client after receiving the sending command, or, sending all the first type of information input to the information editing interface and the second type of information corresponding to all the first type of information to the second client.

Clause 11: The method according to Clause 1, wherein the information display method is applied to an instant messaging system, and the first client comprises a client for achieving an instant messaging function.

Clause 12: The method according to Clause 1, wherein the information editing interface is specifically a session editing interface of the first client.

Clause 13: An information display method, applied to a server, comprising: receiving a request message sent by a first client, wherein the request message comprises a first type of information; obtaining a second type of information corresponding to the first type of information, wherein the second type of information is translation information of the first type of information; and returning a response message for the request message to the first client, wherein the response message comprises the second type of information, so that the first client displays the second type of information in an information editing interface.

Clause 14: The method according to Clause 13, wherein the request message further comprises language information of a second client communicating with the first client; and the process of obtaining the second type of information corresponding to the first type of information specifically comprises: translating the first type of information according to the language information to obtain the second type of information.

Clause 15: The method according to Clause 13, wherein the first type of information comprises information input by a user to the first client before the first client receives a sending command.

Clause 16: The method according to Clause 13, wherein the first type of information comprises a part or all of the complete information input by the user to the first client.

Clause 17: The method according to Clause 13, wherein a long connection is established between the server and the first client; wherein the server receives the request message sent by the first client over the long connection, and the server sends the response message to the first client over the long connection.

Clause 18: An information display apparatus, applied to a first client, comprising: a providing module, used for providing an information editing interface; a receiving module, used for receiving a first type of information input by a user in the information editing interface; an obtaining module, used for obtaining a second type of information corresponding to the first type of information, wherein the second type of information is translation information of the first type of information; and a display module, used for displaying the second type of information in the information editing interface.

Clause 19: The apparatus according to Clause 18, wherein the obtaining module is specifically used for obtaining language information of a second client communicating with the first client in a process of obtaining the second type of information corresponding to the first type of information; translating the first type of information according to the language information to obtain the second type of information; or, obtaining language information of a second client communicating with the first client; sending a request message to a server, wherein the request message comprises the language information and the first type of information; receiving a response message for the request message returned by the server, wherein the response message comprises the second type of information obtained when the server translates the first type of information according to the language information; and obtaining the second type of information corresponding to the first type of information from the response message.

Clause 20: The apparatus according to Clause 18, wherein the receiving module is further used for receiving an operation command for the second type of information input by the user via the information editing interface, and modifying the second type of information according to the operation command to obtain the modified second type of information.

Clause 21: An information display apparatus, applied to a server, comprising: a receiving module, used for receiving a request message sent by a first client and including a first type of information; an obtaining module, used for obtaining a second type of information corresponding to the first type of information, wherein the second type of information is translation information of the first type of information; and a sending module, used for returning a response message for the request message to the first client, wherein the response message comprises the second type of information, so that the first client displays the second type of information in an information editing interface.

Clause 22: A terminal device, comprising: a receiver, used for providing an information editing interface and receiving a first type of information input by a user in the information editing interface; a processor, used for obtaining a second type of information corresponding to the first type of information, wherein the second type of information is translation information of the first type of information; and a display, used for displaying the second type of information in the information editing interface.

Clause 23: A server, comprising: a receiver, used for receiving a request message sent by a first client and comprising a first type of information; a processor, used for obtaining a second type of information corresponding to the first type of information, wherein the second type of information is translation information of the first type of information; and a transmitter, used for returning a response message for the request message to the first client, wherein the response message comprises the second type of information, so that the first client displays the second type of information in an information editing interface.

What is claimed is:

1. A method comprising:
receiving, by a first client, language information of a second client sent by the second client in an instant message process between the first client and the second client;
providing an information editing interface for the first client;
receiving a first type of information input by a user in the information editing interface;
determining whether a second type of information corresponding to the first type of information is directly obtainable, the second type of information being translation information of the first type of information corresponding to the language information of the second client;
upon determining that the second type of information is not directly obtainable, preprocessing the first type of information;
obtaining the second type of information corresponding to the preprocessed first type of information;
displaying the second type of information in the information editing interface;
receiving an operation command for the second type of information input by the user via the information editing interface;
modifying the second type of information according to the operation command to obtain a modified second type of information;
receiving a sending command by the first client; and
sending, to the second client via the information editing interface, all the first type of information input and all the second type information including the modified second type of information.

2. The method according to claim 1, wherein the first type of information comprises information input by the user via the information editing interface before the first client receives the sending command.

3. The method according to claim 1, wherein the first type of information comprises a part or all of the information input by the user via the information editing interface.

4. The method according to claim 1, wherein obtaining the second type of information corresponding to the preprocessed first type of information comprises:
translating the first type of information according to the language information of the second client to obtain the second type of information.

5. The method according to claim 1, wherein obtaining the second type of information corresponding to the preprocessed first type of information comprises:
sending a request message to a server, wherein the request message comprises the language information of the second client and the first type of information;
receiving a response message returned by the server in response to the request message, wherein the response message comprises the second type of information obtained when the server translates the first type of information according to the language information of the second client; and
obtaining, from the response message, the second type of information corresponding to the first type of information.

6. The method according to claim 5, wherein a persistent connection is established between the first client and the server; and the first client sends the request message to the server over the persistent connection, and the first client receives the response message returned by the server over the persistent connection.

7. The method according to claim 1, wherein obtaining the second type of information corresponding to the preprocessed first type of information comprises:
if the first client supports a translation preposition function, obtaining the second type of information corresponding to the first type of information.

8. The method according to claim 1, wherein
the information editing interface comprises a session editing interface of the first client.

9. One or more computer readable media storing executable instructions that, when executed by one or more processors, cause the one or more processors to perform acts comprising:
receiving a request message sent by a first client, wherein the request message comprises a first type of information and language information of a second client, the language information of the second client sent by the second client and received by the first client in an instant message process between the first client and the second client;
determining whether a second type of information corresponding to the first type of information is directly obtainable, the second type of information being translation information of the first type of information corresponding to the language information of the second client;
upon determining that the second type of information is not directly obtainable, preprocessing the first type of information;
obtaining the second type of information corresponding to the preprocessed first type of information;
returning to the first client a response message in response to the request message, wherein the response message comprises the second type of information, so that the first client displays the second type of information in an information editing interface;
receiving an operation command for the second type of information input from the first client;
modifying the second type of information according to the operation command to obtain a modified second type of information;
receiving a sending command from the first client; and
sending, to the second client, all the first type of information input and all the second type information including the modified second type of information.

10. The one or more computer readable media according to claim 9, wherein;
obtaining the second type of information corresponding to the preprocessed first type of information comprises:
translating the first type of information according to the language information of the second client to obtain the second type of information.

11. The one or more computer readable media according to claim 9, wherein the first type of information comprises information input by a user into the first client before the first client receives the sending command.

12. The one or more computer readable media according to claim 9, wherein the first type of information comprises a part or all of the information input by a user into the first client.

13. The one or more computer readable media according to claim 9, wherein a persistent connection is established between the server and the first client; wherein the server receives the request message sent by the first client over the persistent connection, and the server sends the response message to the first client over the persistent connection.

14. The one or more computer readable media according to claim 9, wherein:
a persistent connection is established between the first client and the server,
the first client sends the request message to the server over the persistent connection, and
the first client receives the response message returned by the server over the persistent connection.

15. An apparatus comprising:
one or more processors;
memory;
a providing module stored in the memory and executable by the one or more processors to provide an information editing interface for a first client;
a receiving module stored in the memory and executable by the one or more processors to receive a first type of information input by a user in the information editing interface;
an obtaining module stored in the memory and executable by the one or more processors to:
obtain language information of a second client, the language information of the second client sent by the second client and received by the first client in an instant message process between the first client and the second client,
determine whether a second type of information corresponding to the first type of information is directly obtainable, the second type of information being translation information of the first type of information corresponding to the language information of the second client,
preprocess the first type of information upon determining that the second type of information is not directly obtainable, and
obtain the second type of information corresponding to the preprocessed first type of information;
a display module stored in the memory and executable by the one or more processors to display the second type of information in the information editing interface;
the receiving module further executable by the one or more processors to:
receive an operation command for the second type of information input by the user via the information editing interface, and
modify the second type of information according to the operation command to obtain the modified second type of information; and
a sending module stored in the memory and executable by the one or more processors to send, from the first client to the second client via the information editing interface, all the first type of information input and all the second type information including the modified second type of information in response the receiving module receiving a sending command.

16. The apparatus according to claim 15, wherein the obtaining module is further executable by the one or more processors to perform one of:
translating the first type of information according to the language information of the second client to obtain the second type of information; or
sending a request message to a server, wherein the request message comprises the language information of the second client and the first type of information, receiving a response message returned by the server in response to the request message wherein the response message comprises the second type of information obtained when the server translates the first type of information according to the language information of the second client, and obtaining the second type of information corresponding to the first type of information from the response message.

17. The apparatus according to claim 16, wherein:
a persistent connection is established between the first client and the server,
the first client sends the request message to the server over the persistent connection, and
the first client receives the response message returned by the server over the persistent connection.

18. The apparatus according to claim 15, wherein the first type of information comprises a part or all of the information input by the user via the information editing interface.

19. The apparatus according to claim 15, wherein the first type of information comprises information input by the user via the information editing interface before the first client receives the sending command.

20. The apparatus according to claim 15, wherein the obtaining module stored in the memory and executable by the one or more processors is further to:
obtain the second type of information corresponding to the first type of information if the first client supports a translation preposition function.

* * * * *